Patented Aug. 16, 1932

1,871,682

UNITED STATES PATENT OFFICE

JAMES G. FORD, OF WILKINSBURG, PENNSYLVANIA, ASSIGNOR TO WESTINGHOUSE ELECTRIC & MANUFACTURING COMPANY, A CORPORATION OF PENNSYLVANIA

PROCESS FOR REFINING PARAFFIN AND NAPHTHENE BASE OILS

No Drawing.   Application filed June 1, 1927. Serial No. 195,875.

My invention relates to processes for refining hydrocarbon oils, more specifically to processes for removing oxidation products from hydrocarbon oils without removing substantial quantities of unsaturated hydrocarbons.

In my copending application, Serial No. 195,874, filed June 1, 1927, I describe and claim a method of refining or re-conditioning paraffin-base oils.

It is among the objects of the present invention to provide a process for refining or re-conditioning napthene-base oils without material change in the amount of unsaturated hydrocarbons in the oils.

Another object of my invention is to provide a process for removing the emulsifying agents in a naphthene or a paraffin-base oil that has been treated to remove unsaturated hydrocarbons or that has been treated to remove oxidized products that are formed from hydrocarbons, such as alcohols, acids, aldehydes, ketones and esters.

When naphthene-base oils or oils containing naphthene hydrocarbons are subjected to heating and oxidizing agents, the oil is oxidized and forms soluble and insoluble asphaltic material or sludge and alcohols, aldehydes, ketones, acids and esters. The products of oxidation render the oil viscous and they attack the insulation and other materials of construction of oil-filled apparatus and eventually result in defective elimination of heat from the apparatus, defective insulation and defective lubrication.

Heretofore, oils that have been in service for a time sufficient to develop oxidized products have been thrown away or refined by processes that materially alter the content of unsaturates. Such processes did not improve, and some of them increased the emulsivity of the oil by introducing or producing emulsifying compounds, such as inorganic acids, alkalis or soaps.

In accordance with my invention, I add to a paraffin or a naphthene-base oil that contains oxidized products, a sulphonating agent, such as fuming sulphuric acid or concentrated sulphuric acid having a concentration of at least 95% or liquid sulphur dioxide in amount sufficient to react with or extract the oxidation products but insufficient to remove the unsaturated hydrocarbons.

I have discovered that, when a sufficient amount of a sulphonating agent is added to the oil to react with the oxidation products and the mixture is treated for a sufficient duration of time to complete the reaction, the oxidized products will be sulphonated before the unsaturated hydrocarbons are attacked to any great extent. Therefore, I determine by analysis or by trial the amount of oxidized products in the oil and add such amount of sulphonating agent as is necessary to react with the oxidized products. A liter of oil having a neutralization value of 1.0 mg. of KOH per gram of oil requires about 50 to 60 cubic cm. of concentrated sulphuric acid. I prefer to use about 10 to 20 cubic cm. excess of acid and to agitate the mixture for about ½ hour.

The treatment with concentrated or fuming sulphuric acid may be done at 20° to 40° centigrade, but the treatment with liquid sulphur dioxide must be done at about −10° to −12° C. to prevent the volatilization of the sulphur dioxide. The oxidation products in either paraffin or naphthene-base oils may be sulphonated with sulphuric acid or may be extracted with sulphur dioxide. The process is more difficult when the paraffin-base oils are treated with sulphur dioxide if the oil has a cold test higher than the temperature at which the oil is treated.

After the acid and the dissolved sulphonated materials are settled and the oil is decanted from the surface, I add a dilute solution of a halide salt that is capable of hydrolizing to a comparatively high degree and agitate the mixture. The hydrolized halide removes the emulsifying agents and facilitates and makes possible the subsequent treatment and dehydration of the treated oil. I prefer to add about three volumes of a 1% solution of aluminum chloride ($AlCl_3$) to one volume of oil. Other highly hydrolized halide salts, such as ferric chloride ($FeCl_3$), may be used if desired.

The oil is separated from the watery solution of the halide salt and is then agitated with a solution of alcohol. A 50% solution of denatured alcohol is suitable for this purpose and I prefer to use about one volume of the alcohol solution to one volume of the oil. The alcohol dissolves the residual aluminum chloride and sulphonic acids from the oil. The watery alcohol with its content of dissolved material, separates in a layer on the bottom of the tank. The oil is separated from the alcohol and then washed with water and dried with calcium chloride or anhydrous sodium carbonate or by other appropriate means to remove water. If desired, the oil may be treated with fuller's earth to improve the color and to remove a small residue of undesirable dissolved and suspended matter.

My invention provides a method of treating naphthene and paraffin-base oils, whereby the oxidized products are removed without materially altering the relative amount of unsaturates in the oil. Furthermore, I provide means for removing emulsifying agents from the oil, whereby the complete separation of water from an oil containing emulsifying reagents is made possible.

Although I have described my invention and certain modifications thereof, other modifications of my invention will suggest themselves to those skilled in the art without departing from the spirit of my invention as set forth herein. Therefore, I desire to be limited only by the prior art and by what is defined in the annexed claims.

I claim as my invention:

1. In the process of reconditioning an insulating oil containing oxidation products and unsaturated compounds, the steps which comprise treating the oil with a sufficient amount of a concentrated sulphuric acid to react with the oxidation products of the oil but insufficient to react with a substantial amount of the unsaturated hydrocarbons, removing the oil from the reaction products, treating the oil with an inorganic salt capable of producing demulsification and then separating and removing the oil from the sulphonated products.

2. In the process of reconditioning an insulating oil containing oxidation products and unsaturated compounds, the steps which comprise treating the oil with a sufficient amount of a concentrated sulphuric acid to react with the oxidation products of the oil but insufficient to react with a substantial amount of the unsaturated hydrocarbons, removing the oil from the reaction products, treating the removed oil with an inorganic salt capable of producing demulsification, removing the products of demulsification and treating the oil to remove the residual sulphonation and condensation products.

3. In the process of reconditioning an insulating oil containing oxidation products and unsaturated compounds, the steps which comprise successively treating the oil with and successively removing the oil from a sufficient amount of a highly concentrated sulphuric acid to react with the oxidation products in the oil but insufficient to react with a substantial amount of unsaturated hydrocarbons, an inorganic salt capable of producing demulsification and a sufficient amount of alcohol to dissolve the inorganic salt and residual sulphonation and condensation products.

4. The process of refining an insulating oil containing oxidation products and unsaturated compounds which comprises treating the oil with a sufficient amount of a highly concentrated sulphuric acid to react with the oxidized products in the oil but insufficient to react with more than a minor portion of the unsaturated compounds, removing the reaction products from the oil, and then successively treating the oil with and removing it from an inorganic salt capable of removing emulsifying agents and an alcohol capable of dissolving the inorganic salt and residual sulphonation products and finally removing water soluble materials from the oil.

5. In the process of refining an insulating oil containing oxidation products and unsaturated compounds, the steps which comprise treating the oil with a sufficient amount of a highly concentrated reagent containing sulphur which is capable of causing the oxidation products to separate from the oil but insufficient to remove more than a minor proportion of the unsaturated compounds, removing the oil from the products and then treating the oil with and removing it from an inorganic salt capable of producing demulsification.

6. In the process of refining an insulating oil containing oxidation products and unsaturated compounds, the steps which comprise treating the oil with a sufficient amount of a highly concentrated sulphuric acid to react with the oxidation products of the oil but insufficient to react with more than a minor proportion of the unsaturated hydrocarbons and removing the oil from the reaction products.

7. In the process of refining an insulating oil containing oxidation products and unsaturated hydrocarbons, the step which comprises treating the oil with from approximately 5% to 7% by volume of a concentrated suphonating agent for a sufficient time to remove the oxidation products but for an insufficient time to react with more than a minor proportion of the unsaturated hydrocarbons and removing the oil from the reaction products.

8. In the process of refining an insulating oil containing oxidation products and unsaturated hydrocarbons, the step which comprises treating the oil with from approximately 5% to 7% by volume of concentrated sulphuric acid for a sufficient time to remove the oxidation products but for an insufficient time to react with more than a minor proportion of the unsaturated hydrocarbons and removing the oil from the reaction products.

In testimony whereof, I have hereunto subscribed my name this 26th day of May, 1927.

JAMES G. FORD.